US 9,110,301 B2

(12) United States Patent
Lippert et al.

(10) Patent No.: US 9,110,301 B2
(45) Date of Patent: Aug. 18, 2015

(54) MICROSCOPE WITH A SHEET OF LIGHT

(75) Inventors: Helmut Lippert, Jena (DE);
Christopher Power, Cheadle Hulme (GB); Robert Hauschild, Vienna (AT); Matthias Wald, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 466 days.

(21) Appl. No.: 13/497,996

(22) PCT Filed: Sep. 17, 2010

(86) PCT No.: PCT/EP2010/063665
§ 371 (c)(1),
(2), (4) Date: Mar. 23, 2012

(87) PCT Pub. No.: WO2011/036094
PCT Pub. Date: Mar. 31, 2011

(65) Prior Publication Data
US 2012/0200693 A1      Aug. 9, 2012

(30) Foreign Application Priority Data
Sep. 24, 2009   (DE) .......................... 10 2009 044 983

(51) Int. Cl.
*G02B 21/06*   (2006.01)
*G02B 21/24*   (2006.01)
*G02B 21/00*   (2006.01)

(52) U.S. Cl.
CPC ............ *G02B 21/241* (2013.01); *G02B 21/002* (2013.01); *G02B 21/06* (2013.01)

(58) Field of Classification Search
CPC ..... G02B 21/06; G02B 21/002; G02B 21/241
USPC .......................... 359/379, 380, 385, 388, 676
See application file for complete search history.

(56) References Cited

U.S. PATENT DOCUMENTS 5,383,058 A * 1/1995 Yonezawa ..................... 359/687
6,285,019 B1   9/2001 Engelhardt et al.
(Continued)

FOREIGN PATENT DOCUMENTS

DE           102 57 423 A1   6/2004
DE    10 2007 011 305 A1    9/2008
(Continued)

OTHER PUBLICATIONS

Voie, A.H., et al., "Orthogonal-plane fluorescence optical sectioning: three-dimensional imaging of macroscopic biological specimens," *Journal of Microscopy*, vol. 170, Pt. 3, pp. 229-236 (Jun. 1993).
(Continued)

*Primary Examiner* — Frank Font
(74) *Attorney, Agent, or Firm* — Patterson Thuente Pedersen, P.A.

(57) ABSTRACT

A family of microscopes with illumination systems directing a sheet of light having an approximately planar extension in an illumination axis of an illumination beam path and in a transverse axis orthogonally oriented to the illumination axis. The microscopes have detection devices used to detect light that is emitted by a sample region. The detection devices including a detection lens system disposed in the detection beam path and an optical detection element spaced from a front lens of the detection lens system and independently adjustable thereof. The optical detection element continuously varies the size of a detection image field and/or continuously displaces a focal plane of detection in the P-region.

14 Claims, 8 Drawing Sheets

(56) References Cited

U.S. PATENT DOCUMENTS

| | | | |
|---|---|---|---|
| 6,816,321 B2* | 11/2004 | Zimmer et al. | 359/686 |
| 6,822,790 B2 | 11/2004 | Knoblich | |
| 7,068,426 B2 | 6/2006 | Bruehl et al. | |
| 7,177,093 B2* | 2/2007 | Huettel et al. | 359/683 |
| 7,554,725 B2 | 6/2009 | Stelzer et al. | |
| 7,789,179 B2 | 9/2010 | Steiner et al. | |
| 7,826,653 B2* | 11/2010 | Mori et al. | 382/141 |
| 8,711,211 B2* | 4/2014 | Betzig | 348/79 |
| 2002/0109912 A1 | 8/2002 | Knoblich | |
| 2004/0004762 A1 | 1/2004 | Bruehl et al. | |
| 2006/0011832 A1 | 1/2006 | Wolleschensky et al. | |
| 2006/0033987 A1 | 2/2006 | Stelzer et al. | |
| 2007/0109633 A1* | 5/2007 | Stelzer | 359/385 |
| 2008/0316469 A1 | 12/2008 | Birk et al. | |
| 2009/0237765 A1 | 9/2009 | Lippert et al. | |
| 2010/0142037 A1* | 6/2010 | Nakayama | 359/380 |

FOREIGN PATENT DOCUMENTS

| | | |
|---|---|---|
| DE | 10 2007 015 063 A1 | 10/2008 |
| DE | 10 2007 024 757 A1 | 11/2008 |
| EP | 1 617 248 A1 | 1/2006 |
| JP | 9-230245 | 9/1997 |
| JP | 2002-516409 | 6/2002 |
| JP | 2004-78162 | 3/2004 |
| JP | 2006-509246 | 3/2006 |
| JP | 2007-322451 | 12/2007 |
| JP | 2008-250303 | 10/2008 |
| WO | WO 98/28646 | 7/1998 |
| WO | WO 99/60437 | 11/1999 |
| WO | WO 2004/053558 A1 | 6/2004 |

OTHER PUBLICATIONS

Huisken, Jan, et al., "Optical Sectioning Deep Inside Live Embryos by Selective Plane Illumination Microscopy," *Science,* vol. 305, pp. 1007-1009 (Aug. 13, 2004).

Reynaud, Emmanuel G., "Light sheet-based fluorescence microscopy: More dimensions, more photons, and less photodamage," *HFSP Journal,* pp. 266-275 (2008).

Keller, Philipp J., et al. "Reconstruction of Zebrafish Early Embryonic Development by Scanned Light Sheet Microscopy," *Sciencexpress,* 12 pgs. (Oct. 9, 2008).

Keller, Philipp, et al., "Quantitative in vivo imaging of entire embryos with Digital Scanned Laser Light Sheet Fluorescence Microscopy," *Current Opinion in Neurobiology,* vol. 18, pp. 1-9 (2009).

Becker, K., et al., "Ultramicroscopy: 3D reconstruction of large microscopical specimens," *J. Biophoton.,* vol. 1, No. 1, pp. 36-42 (2008).

Santi, Peter A., et al., "Thin-sheet laser imaging microscopy for optical Sectioning of thick tissues," BioTechniques, vol. 46, pp. 287-294 (Apr. 2009).

Huisken, Jan, et al., "Even fluorescence excitation by multidirectional Selective plane illumination microscopy," *Optics Letters,* vol. 32, No. 17, pp. 2608-2610 (Sep. 1, 2007).

\* cited by examiner

MICROSCOPE WITH A SHEET OF LIGHT

PRIORITY CLAIM

The present application is a National Phase entry of PCT Application No. PCT/EP2010/063665, filed Sep. 17, 2010, which claims priority from German Application Number 102009044983.3, filed Sep. 24, 2009, the disclosures of which are hereby incorporated by reference herein in their entirety.

FIELD OF THE INVENTION

The invention relates to a microscope comprising an illumination device which produces a light sheet to illuminate a sample region, the said sheet having an approximately planar extension in the direction of an illumination axis X of an illumination beam path and in the direction of a transverse axis Y lying across the illumination axis X. The microscope further comprises a detection device used to detect light that is radiated by the sample region along a detection axis Z of a detection beam path, the illumination axis X and the detection axis Z as well as the transverse axis Y and the detection axis Z being oriented relative to each other at an angle unequal to zero. Preferably, the respective axes are oriented approximately normal to each other.

BACKGROUND OF THE INVENTION

Such a microscope design comes under the category known as SPIM microscopes (SPIM—Selective Plane Illumination Microscopy). In contrast to confocal laser scanning microscopy (LSM), in which a three-dimensional sample is scanned point by point in individual planes at different depths and the image information obtained thereby is subsequently assembled to form a three-dimensional image of the sample, the SPIM technology is based on wide-field microscopy and permits the imaging of the sample on the basis of optical sections through various planes of the sample.

The advantages of the SPIM technology consist, among others, in the greater speed at which the image information is detected, the reduced risk of bleaching of biological samples, and a greater penetration depth of the focus into the sample.

The principle of SPIM technology is that fluorophores contained in the sample originally or added to it for contrasting are excited with laser light, the laser radiation being shaped into a so-called light sheet. The light sheet is used to illuminate a selected plane in the depth of the sample in the sample region, and an imaging lens system is used to obtain an image of this sample plane in the form of an optical section.

First modern approaches to SPIM technology are described by A. H. Voie et al., Journal of Microscopy, Vol. 170 (3), pp. 229-236, 1993. Here, the fundamentals of modern SPIM technology are explained, in which a coherent light source is used to illuminate a sample, the light sheet being produced with the aid of a cylindrical lens. Arranged normal to the propagation direction of the light sheet, which has a finite thickness, though, are detection means comprising an imaging lens system and a camera.

In recent years, the technology was developed further, especially with regard to its application in fluorescence microscopy. For example, DE 102 57 423 A1 and, based on it, WO2004/053558A1 describe methods in which a light-sheet-like illumination is produced due to a relative movement between a line-shaped field of light and the sample to be examined. The light-sheet-like illumination is formed by the field of light being repeated in a temporal succession so as to be lined up side by side due to the relative movement. In this way, though, shadows are formed within the sample plane to be examined, on account of parts of the sample that lie in the direction of illumination and are not transparent to the illuminating light. Similar setups are also described by Stelzer et al., Science (305) pp. 1007-1009 (2004), and Reynaud et al., HFSP Journal 2, pp. 266 (2008).

Instead of a purely static light sheet, for the generation of which a cylindrical lens system is used, it is possible to produce a quasi-static light sheet by rapidly scanning the sample with a rotationally symmetric light beam. The integration time of the camera on which the sample is imaged is chosen so that the scan is completed within the integration time. Such setups are described, e.g., by Keller et al., Science (322), pp. 1765 (2008), and Keller et al., Current Opinion in Neurobiology 18, pp. 1-9 (2009).

All the setups and methods known in prior art, however, have more or less grave disadvantages, which restrict the use of the SPIM technology in the commercial sphere, where it is important, among other things, to achieve a high user friendliness of the microscopes and, as a rule, a high throughput, with a great number of samples having to be examined within a relatively short time. Essential disadvantages are described below.

In most of the setups using SPIM technology that have been implemented so far, e.g., those according to DE 102 57 423 A1 and WO2004/053558A1, the mere variation of the image field size for detection—e.g., switching from an image field size providing a good overview of the sample to a detail region—is rather a complex and time-consuming affair. It can only be implemented by a change of the detection objective. This affects the sample space unfavorably, which may have a particularly negative effect in case of a horizontal detection beam path. In the worst case, it also involves the removal and emptying of the sample chamber. After this, refocusing is necessary as a rule. Moreover, the sample is unnecessarily heated or cooled.

An improvement is described by Becker et al., Journal of Biophotonics 1 (1), pp. 36-42 (2008). Here, the detection beam path is arranged vertically, so that a change of the image field size can be carried out without any substantial interaction with the sample chamber volume. The detection objective can be put into the sample chamber and taken out from above in a simple manner. Nevertheless, slight interactions with the sample chamber and, thus, indirectly with the sample cannot be avoided.

Adaptation of the image field size is even simpler if zoom detection objectives are used. Such a setup is described, e.g., by Santi et al., Biotechnics 46, pp. 287-294 (2009). Here, a commercial microscope, the Olympus MVX10, which has a zoom objective, is used for detection. This, too, is inserted into the sample chamber from above, which is, as a rule, filled with an immersion liquid, so that, here again, there are slight interactions with the sample chamber when the zoom function of the objective is working or when the focus is adjusted, alone because of the motorized shifting of the lenses, which may cause vibrations that may transmit to the liquid in the sample chamber.

If the image field size for detection is changed, it is also desirable to adapt the illumination-side image field, i.e. to adapt the extension of the light sheet along the transverse axis Y and the detection axis Z. In prior art, this adaptation has so far been implemented by the use of interchangeable diaphragms and/or beam expanders, as described, e.g., by Keller et al., Science 322, pp. 176 ff. (2008), and by Huisken et al., Optics Letters 32 (17), pp. 2608-2610 (2007). The flare occurring in case of diaphragms causes light losses, whereas the use of beam expanders reduces flexibility, since exchanging them is rather laborious.

While in the classical way, as described, e.g., in WO2004/053558A1, the light sheet is produced via cylindrical lenses arranged in the beam path, the recent state of prior art, as described, e.g., in the above-mentioned article by Keller et al., Science 322, pp. 176 ff. (2008), uses setups in which no static light sheet is produced but merely a quasi-static light sheet, where the sample is rapidly scanned by a rotationally symmetric light beam. 'Rapidly' means that the integration time of the spatially resolving array detector used as a rule, e.g., a camera with CCD chip or CMOS chip, is chosen so that the light beam scans the sample region corresponding to the quasi-static light sheet within this integration time. The integration time—which, in the camera, e.g., corresponds to the shutter opening time—and the scanning frequency or scanning time of the light beam may, as a rule, be set independently of each other, so that the scanning time can be adapted to a fixed integration time. As scanning with a rotationally symmetric light beam also produces a light sheet, at least in effect, this approach is also subsumed under the generation of a light sheet.

Both kinds of light sheet generation have advantages and disadvantages. With the use of cylindrical lenses, e.g., there is less of a load on the sample, because the intensity with which the sample is irradiated can be selected at a lower level while nevertheless the same dose is achieved as in case of scanning. Also, the use of cylindrical lenses is well suitable for recording image sequences in fast succession within very short times, since the speed is not limited by movable elements in the illumination beam path. In particular, a stroboscope-like illumination can be implemented very well with the use of cylindrical lenses. In scanning, the swiveling scanning mirror used, as a rule, is apt to be the speed-limiting element. If plain scanning is combined with angular scanning, i.e. illumination from different angles, in order to reduce banding as described, e.g., in DE 10 2007 015 063 A1, there is a risk that beat artefacts will be produced if the scanners for light sheet angle scanning and position scanning are not matched, i.e. not synchronized.

Advantages of light sheet generation by scanning are given by, among other things, the fact that it permits a more homogeneous illumination of the sample, so that quantitative image evaluations are possible as well, which by the use of a cylindrical lens system can be achieved only approximately by flaring through a diaphragm, which entails light losses. Moreover, a flexible choice of the maximum deflection of the scanner will permit the size of the image to be adapted with high flexibility. Scanning reduces the spatial coherence of the excitation light, which also leads to a reduction of banding. Finally it is possible, by special modulations of the light source, e.g. with an AOTF, to project grid patterns into the sample.

In other setups described in prior art, the sample is illuminated from both sides, from opposite directions along the illumination axis X. In the setup described by Santi et al., Biotechnics 46, pp. 287-294 (2009), the sample is illuminated simultaneously from both sides. For many kinds of samples, such as embryos of the fruit fly (Drosophila), such a setup is not of advantage, because in this way scattering and non-scattering image portions are combined in an unfavorable way. Huisken et al., Optics Letters 32(17), pp. 2608-2610 (2007), and Becker et al., Journal of Biophotonics 1 (1), pp. 36-42 (2008), describe setups that illuminate the sample sequentially, i.e. alternately from the two directions along the illumination axis X, which is more favorable for the sample mentioned above. For switching back and forth between the two illumination directions, a vibration-producing shutter or a rotating mirror is used, so that the times required for switching are relatively long.

Keller et al., in Science 322, pp. 1765 ff. (2008) and in Current Opinion in Neurobiology, 18, pp. 1-9 (2009), describe an SPIM setup in which the illumination and/or detection objective is mounted on a piezo motor, which permits focusing. Here, then, setting the focusing distance is accomplished via a displacement of the entire objective. In particular, the distance of the front lens from the image plane is not maintained, so that an interaction with the sample chamber is possible. This applies especially to horizontal detection beam paths with immersed detection objectives: Here, the necessary movement of the objective entails tightness problems. On the other hand, a movable element in the sample space is disturbing in general, as the user may need space there for diverse means for feeding to the sample chamber. The vibrations occurring during the movement of the objective may be unfavorably transmitted to the sample, since the space between the objective and the sample is occupied by a liquid rather than by air.

If scanners are used for producing the light sheet, the imaging of the scanner into the pupil of the illumination objective is not optimal, as a rule, so that the plain position scanning is superposed by portions of angular scanning.

Also known in prior art are setups in which the detection beam path is split up into two branch beam paths; this is described, e.g., in the two publications by Keller et al. mentioned above. For the beam splitting one uses beam splitters which transmit part of the light into one branch beam path and reflect the other part of the light into the other branch beam path. For this purpose one uses common dichroic filters having a relatively small thickness of less than 2 mm, which are arranged in a divergent part of the detection beam path. The advantage of such an arrangement is that in the direction of transmission there occur hardly any artefacts caused by astigmatism. In the direction of the reflected light, however, image artefacts such as astigmatism or also defocusing do occur, due to surface tensions at the dichroic filter, which can be caused, e.g., by the coating, or by improper installation. Another way of splitting into two branch detection beam paths is described by Huisken et al. in Optics Letters 32, pp. 2608-2610 (2007). Here, the dichroic filter is located at infinity (related to the beam path), so that, here again, the problems occurring in transmission are minimized. As far as the reflected branch beam path is concerned, though, the problem of surface tensions may occur here, too, if conventional dichroic filters are used.

SUMMARY OF THE INVENTION

A microscope comprising an illumination device which produces a light sheet to illuminate a sample region, the said sheet having an approximately planar extension in the direction of an illumination axis X of an illumination beam path and in the direction of a transverse axis Y lying across the illumination axis X. The microscope further comprises a detection device used to detect light that is radiated by the sample region along a detection axis Z of a detection beam path, the illumination axis X and the detection axis Z as well as the transverse axis Y and the detection axis Z being oriented relative to each other at an angle unequal to zero. Preferably, the respective axes are oriented approximately normal to each other.

In an embodiment of the invention, the detection device is provided with an optical detection element that is arranged spatially separate from a front lens of the detection objective and that can be adjusted independently of this front lens, the said optical detection element being used to continuously vary the size of a detection image field and/or to continuously displace a detection focal plane in the sample region. Front lens in this context means the lens, or a corresponding cemented component, that is located first in the beam path, i.e., closest to the sample region.

An advantage of embodiments of the invention is that the size of the detection image field can be continuously varied by means of the optical detection element; secondly, the detection element can be used to continuously displace a detection focal plane in the sample region. The detection element may be designed in such a way that it performs only one of these two tasks, or can be used to perform both settings either alternately or simultaneously. The detection element may be an integral part of the detection objective, say, in the form of two or more lens components movable relative to each other, with the front lens remaining stationary during the movement of these lens components. Alternatively, the detection element may be a separate component in the beam path, arranged at some distance from the detection objective.

In an embodiment, the optical detection element may be designed as a detection zoom element. For example, the detection zoom element may comprise two movable lens components and a fixed lens component in between. Other configurations of the detection element with but a single movable lens component, or with the fixed lens component located elsewhere, or with more than two movable lens components are feasible as well. The use of a detection zoom element enables simple switching between an overview image and a detail image, and efficient locating of a sample region of interest. For the automated generation of tables of control element positions, one can use an intermediate image sample such as, e.g., a transmission grid pattern inserted in an intermediate image plane of the detection beam path. Alternatively, a calibration objective can be used. By suitable shifting of the detection zoom element it is also possible to compensate various chromatic aberrations of the detection device; different tables can be generated for different emission wavelengths and zoom positions. To compensate the said aberrations, the focal plane in the sample region is shifted continuously by means of the detection zoom element, going by the tables if necessary. Because of the spatial separation between the front lens of the detection objective and the detection zoom element, the detection objective itself, or, in particular, the front lens of the detection objective need not be moved; by means of the detection zoom element, which is arranged at a permanent location in the detection beam path, so-called internal focusing of the detection beam path can be performed. This offers advantages both in handling the sample and in recording image stacks along the detection direction.

In another embodiment, the detection direction can be provided with a tube lens unit arranged spatially separate from the detection element and from the detection objective, by means of which tube lens unit the detection focal plane can be shifted in the sample region. In this case, the detection element, particularly the detection zoom element, is used only for changing the image field size, whereas the adjustment of the focal plane is done, e.g., by shifting a suitable tube lens or a tube lens element of the tube lens unit. The combination of both ways, i.e., with the detection focal plane being adjustable with both the tube lens unit and the detection zoom element, is another possible embodiment.

In another embodiment of the invention, the illumination device in the illumination beam path is provided with at least one illumination objective and an optical illumination element that is arranged spatially separate from a front lens of the illumination objective and is adjustable independently of it, by means of which optical illumination element the extension of the light sheet in the direction of the detection axis Z is continuously variable and/or by means of which an illumination focal plane in the sample region can be continuously shifted. With the illumination element, then, it is possible to continuously adapt the illumination-side image field size or magnification, or also to define the focus. The illumination element may be an integral part of the illumination objective—say, in the form of two or more lens components that are movable relative to each other, with the front lens remaining stationary during the movement of these lens components. Alternatively, the illumination element may be a separate component in the beam path arranged at some distance from the illumination objective.

This is possible in a particularly simple manner if the illumination element is designed as a illumination zoom element with preferably at least three lens components that can be shifted independently of each other. If the detection device is provided with a detection zoom element, the illumination zoom element can be used to optimally and continuously match the numerical aperture of the illumination to the size of the detection image field. In this way, the frequency of changing the illumination objectives is reduced, and sample stress is always kept at the lowest possible level. The ratio between detection-side image field size and illumination-side image field size can be set in such a way that a ratio of the light sheet thicknesses of 1 at the center to 2 on the margin of the field of view is set and kept constant when the image field size is varied.

The use of three shiftable elements is advantageous in so far as, in addition to the correct magnification, the correct imaging of pupil and intermediate image can be guaranteed. Altogether, adjustments can be made in three degrees of freedom by means of the three separately shiftable elements. Where adjustments are needed in fewer degrees of freedom, correspondingly fewer shiftable lens elements are required in the detection zoom element.

For adapting the illumination-side image field size to the size of the detection image field it is of advantage if the illumination zoom element and the detection zoom element are coupled via a control circuitry for setting the illumination zoom elements as a function of the detection image size given by the detection zoom element and also, of course, by the static magnification of the other detection optical components. In this case, if the size of the detection image field is varied, e.g. manually by the observer, the illumination-side image field size is automatically adapted to this variation. The control circuitry may, of course, also be conceived for detection and/or illumination elements, which are part of the respective detection or illumination objective.

The invention further provides a microscope wherein the illumination device additionally comprises first means for light sheet generation, which, in turn, comprise means for generating a rotationally symmetric light beam and scanning means for light-sheet-like scanning of the sample region along the transverse axis in a specified time interval, with the illumination device further comprising second means for light sheet generation, which in turn comprise a first astigmatically acting optical element with at least one astigmatic lens for generating a static light sheet, and in which microscope there are further provided selecting means with which, for generating the light sheet, either the first or the second means for light sheet generation or both together can be selected. As an astigmatically acting lens, one can use, e.g., a cylindrical lens, but some other astigmatically acting lens such as a Powell lens may be used as an equivalent.

Whereas the first means for light sheet generation generate a quasi-static light sheet by means of a fast scanning mirror, the second means for light sheet generation generate a static light sheet. In this way, the advantages of scanning light sheet generation can be combined with those of light sheet generation by means of a cylindrical lens system. For expediency, the scanning means comprise a rapidly switchable scanning mirror and a scanning objective. One can, selectively, use one or the other method of light sheet generation; thus it is possible, e.g., to leave the scanning mirror in its zero position and, by means of the cylindrical optical element, to generate a static light sheet, which illuminates the sample in the manner of a stroboscope, for which the scanning mirror is too slow. In addition, angle scanning means may be provided, by means of which the angle between the light sheet and the illumination axis can be varied. The angle scanning means, too, may comprise a rapidly switchable angle scanning mirror. This may be, for example, a resonance scanner of the microelectromechanical type. As a rule, the angle scanning mirror operates at a frequency of 10 kHz, whereas the scanning mirror for generating the light sheet operates at a frequency approximately between 1 kHz and 2 kHz.

The angle scanning mirror may be arranged conjugated to the illumination focal plane if the second means for light sheet generation have been selected, i.e., if, for example, the cylindrical optical element is in the beam path. By means of the angle scanning mirror, the sample can be illuminated from different angles, which can be used to reduce banding.

In addition to the fast scanning mirror for light sheet generation, and in its immediate vicinity, another fast scanning mirror may be placed in the beam path, with which, e.g., the light sheet can be shifted in the direction of the detection axis for adjusting purposes, or the light can be deflected into another illumination beam path; the latter action, however, can also be performed by means of a separate switching mirror.

In addition, then, a second astigmatically acting optical element, which also may be configured as a cylindrical optical element, may be arranged in the illumination beam path. This serves to correctly image one of the two scanning mirrors onto a pupil plane, while the other scanning mirror is correctly imaged without the action of the cylindrical optical element. Essentially, this second element is a corrective optical system for the correct imaging of the two scanning mirrors mentioned.

Embodiments of the invention further provides a microscope in which the illumination device additionally comprises means for deflecting illumination light in another illumination beam path and for generating another light sheet, which is of approximately planar extension in the direction of the illumination axis and in the direction of the transverse axis, with the illumination beam path and the other illumination beam path are constructed of essentially identical optical elements and have identical optical path lengths, and with the light sheet and the other light sheet being aligned relative to one another in such a way that they illuminate the sample region from opposite directions on the same illumination axis, the illumination device further comprising switching means for switching the illumination light between the illumination beam path and the other illumination beam path, and the detection device comprising a detection objective for imaging light radiated from the sample region light onto an array detector for locus-dependent detection of that light, with the switching means comprising a rapidly switchable switching element having a switching interval of less than 10 ms, with a specified integration time of the array detector and the switching interval of the switching elements being tuned to each other in such a way that, during the integration time, the sample region is illuminated at least once from either direction on the illumination axis.

Therefore, the integration times for the array detector, i.e., the time within which, e.g., the shutter of a camera is open and measurement data are collected, are minimized, or the signal-to-noise ratio may be influenced adversely. It is of advantage, therefore, to use a galvanometer-driven mirror having a switching interval of less than 10 ms.

Instead of a switching mirror one may use other switching elements, such as acousto-optical or electro-optical switching elements, which may operate on a reflective or, equivalently, on a transmissive basis.

What is important is that, compared to the integration time of the array detector (which does not exceed 20 ms, as a rule, as otherwise vibrations could have an adverse effect), the switching interval should be short enough to permit the sample region to be illuminated at least once from either direction within the integration time. Multiple scans from either direction are feasible as well if the switching interval is small enough, e.g., less than 5 ms.

In this way, rapidly switchable two-beam illumination can be achieved, which can be used for sequential alternating illumination of the sample from two sides and for quasi-simultaneous illumination of the samples from two sides, depending on the nature of the sample. The term "quasi-simultaneously" is used because the illumination direction changes during the integration time of the camera, and—in case the light sheet is generated in a scanning manner, with the sample being scanned by a rotationally symmetric light beam—the light beam scans the sample at least twice, but from different directions. With the short switching intervals mentioned, the sample does not change its position, as a rule, so that in the image, in effect, the sample appears as illuminated from both sides.

In effect, then, the sample in the sample region may be illuminated simultaneously from opposite directions along the illumination axis, in that, during the integration time of the array detector, the illumination light is switched at least once from one illumination beam path to the other.

The switching mirror may be favorably arranged in a plane conjugated to the illumination pupil. This has the advantage that, for switching over, the positional offset is utilized that is created by the deflection of the switching mirror and by using the scanning objective. Alternative setups in which the angular offset is used directly for switching are feasible as well.

The illumination device may also comprise means for light sheet generation, which in turn comprise means for generating a rotationally symmetric light beam and scanning means for light-sheet-like scanning of the sample region along the transverse axis, with the scanning means comprising, e.g., a rapidly switchable scanning mirror and a scanning objective. Optionally, angle scanning means may be provided, by means of which an angle between the light sheet and the illumination axis is variable. These angle scanning means may comprise, for example, a rapidly switchable angle scanning mirror for the reduction of banding.

In addition to the fast scanning mirror for light sheet generation, and in its immediate vicinity, another fast scanning mirror may be placed in the beam path, with which, e.g., the light sheet can be shifted in the direction of the detection axis for adjusting purposes. This can also be performed by means of the switching mirror.

With the setup suitably configured, the other fast scanning mirror or switching mirror may, by a slight offset, also be used for adjusting the light sheet in the detection direction.

Herein it can be of advantage that the illumination device comprises an astigmatically acting optical element, preferably a cylindrical optical element, which is arranged in the one illumination beam path or in the other illumination beam path and serves to correctly image the scanning mirror, the switching mirror or the other scanning mirror onto a pupil plane. Whereas one of the two mirrors is correctly imaged onto the pupil plane, imaging of the other mirror without such an additional astigmatically acting element would not be correct; this element, then, is an optical correction system for the correct imaging of both mirrors.

An interesting application results if the array detector has areas of pixels which can be read out separately and for which different integration times can be specified, as it is the case, e.g., with modern array detectors on CMOS basis. Here, the switching interval of the switching element can additionally be synchronized with these differing integration times.

Embodiments of the invention further provide a microscope of in which the detection device additionally comprises in the detection beam path a detection objective and splitting means for splitting the detection beam path into two branch beam paths, with a spatially resolving array detector arranged in each of the branch beam paths, on which array detector the light to be detected is imaged, and with the splitting means in turn comprising at least one dichroic beam splitter, the dichroic beam splitter being arranged in the beam path in the near-infinity space relative to the spatially resolving array detectors and having a thickness of at least 3 mm, preferably upwards of at least 4 mm, and optical imaging elements for the imaging of the light to be detected onto the respective array detector being arranged in each of the two branch beam paths, and at least one wobble plate being arranged in at least one of the two branch beam paths, for generating a beam offset along two mutually orthogonal directions transversely to the detection axis. In this way, superpositions of the measurement data read out of the two array detectors can be achieved automatically. In particular, adaptation to different camera types possibly employed by end users can be accomplished without problems. If only one wobble plate is used, it must be possible to set it to the two orthogonal directions. With equivalent effect, one can use two wobble plates. One of them is then used to adjust the beam offset in one direction, while the other plate is used to adjust the beam offset in the direction orthogonal to it.

In embodiments of the invention a transmission pattern, e.g., a transmission grid pattern, may be placed in an intermediate image plane of the detection beam path, this transmission pattern being selectable and serving to aligning the images with each other. Alternatively, a calibration objective can be used in the position of the detection objective. Once the images have been aligned, the transmission grid pattern or the calibration objective can be removed again from the beam path. Superposition of the images can then be accomplished automatically. Setting the offset may be performed by means of the wobble plates, the wobble plates may be arranged in one of the two branch beam paths.

The optical imaging elements in the respective branch beam paths can be arranged so as to be shiftable, so that focusing onto the respective array detector is possible. This is of advantage particularly for compensating longitudinal chromatic aberrations, e.g., if measurements are carried out on samples marked with two different dyes and the spectral emission ranges or emission wavelengths are to be detected in the two branch beam paths. It may be sufficient if at least one of the optical imaging elements can be shifted, if focusing can be performed by other means provided.

As an addition or an alternative, each of the two branch beam paths may be provided with a wedge assembly consisting of two optical wedges protruding into the beam path and shiftable relative to each other transversely to the beam direction, this wedge assembly being arranged between the optical imaging element and the array detector, i.e. in the divergent part of the beam path, so that focusing on the respective array detector can be achieved by shifting the wedges relative to each other.

Instead of arranging the beam splitter in the near-infinity space of the beam path, the dichroic beam splitter may also be arranged in the divergent part of the beam path between the array detectors and an optical imaging element for imaging the light to be detected onto the array detectors. In the branch beam path that captures the light transmitted by the beam splitter, then, a glass plate of identical thickness as the beam splitter may be arranged between array detector and beam splitter, the glass plate and the beam splitter enclosing an angle of approximately 90°. In this way, any astigmatism caused by the use of the beam splitter in the transmission branch beam path is corrected.

In an embodiment, this glass plate is designed as a wobble plate; therefore, it can be used also for generating a beam offset transversely to the beam direction, so that, here again, automatic superposition of the measurement data read out of the array detectors can be accomplished.

For changing the focus position in a simple embodiment, the optical imaging element can be arranged so as to be shiftable, so that it can be used to focus on the array detectors. If two different wavelengths are measured, it can be assumed that, for at least one of the two wavelengths, focusing is not exact. To avoid this, a wedge assembly consisting of two optical wedges that protrude into the beam path and can be shifted transversely to the beam direction is arranged in at least one of the two branch beam paths between the beam splitter and the array detector, thus allowing focusing on the respective array detector. In this case, first the beam path not containing the wedge assembly, e.g., the transmission branch beam path, is focused by means of shifting the optical imaging element. This is done for one of the two wavelengths to be measured. Then the two wedges in the other beam path, e.g., the reflection branch beam path, are shifted relative to each other for fine adjustment for the other wavelength. As an alternative, the optical imaging element may be arranged in a fixed position, and wedge assemblies may be arranged accordingly in each of the branch beam paths.

It is understood that the features mentioned before and those to be explained below are applicable not only in the combinations stated but also in other combinations or as stand-alone features without leaving the scope of the present invention.

DETAILED DESCRIPTION

Figure 1:
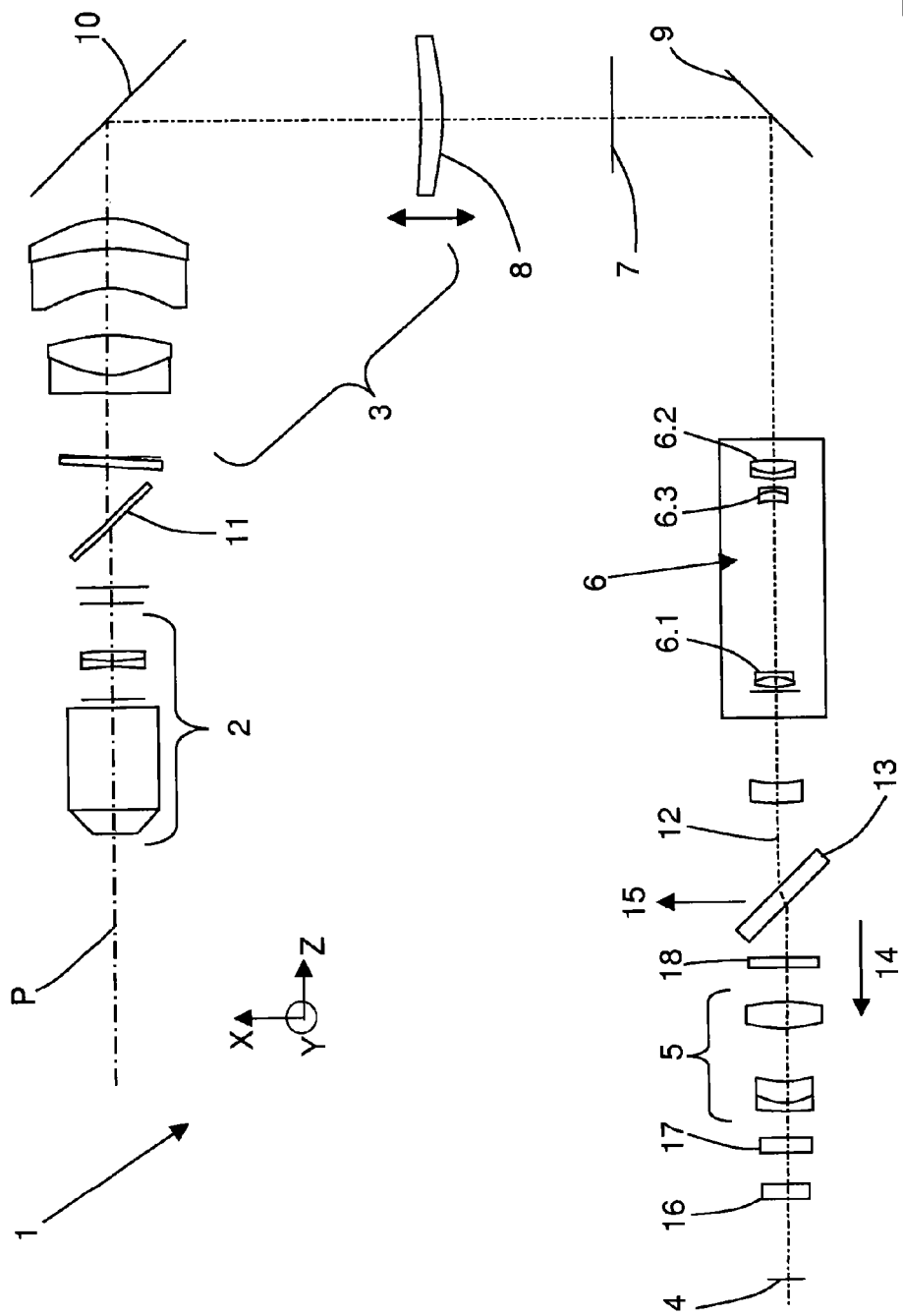
FIG. 1 shows a detection beam path for an SPIM microscope.

FIG. 1 shows a detection beam path of a microscope operating by the principle of SPIM technology. Pertaining to it, though not shown in FIG. 1, is an illumination device of the microscope, with which a light sheet for illuminating a sample region P is generated. In the direction of an illumination axis X of an illumination beam path and in the direction of a transverse axis Y lying across the illumination axis X, the light sheet has an approximately planar form. Shown along the detection beam path are elements of a detection device 1 used to detect light that is radiated by the sample region P along a detection axis Z. The illumination axis X and the detection axis Z are approximately perpendicular to each other, as are the transverse axis Y and the detection axis Z.

The detection device 1 comprises a detection objective 2 arranged in the detection beam path. Other essential elements in the detection beam path 1 are a tube lens unit 3 and a spatially resolving array detector 4, which may be designed, e.g., as a CCD chip or as a CMOS chip of a suitable camera. The light is imaged onto this array detector 4 by means of an optical imaging element 5.

An element of the detection device 1 is an optical detection element, which is arranged so as to be separated from the front lens of the detection objective 2 and can be adjusted independently of this front lens. By means of the optical detection element, on the one hand, the size of a detection image field is continuously variable, and on the other hand, the detection element can be used to continuously shift a detection focal plane in the sample region P. The detection element can be designed so as either to serve only one of the two tasks or both tasks alternatively, or so that both settings can be carried out simultaneously. The detection element may be an integral part of the detection objective 2, e.g., in the form of two or more lens components that are movable relative to each other, whereas the front lens remains stationary during the movement of these lens components. Alternatively, the detection element may be arranged as a separate component in the beam path at a distance from the detection objective 2. During an adjustment of the detection element, i.e., a shifting of one or several of its lens components along the beam path, the front lens remains stationary.

The optical detection element as a separate component may be designed, e.g., as shown in FIG. 1, as a detection zoom element 6 with two movable lens components 6.1 and 6.2 and a fixed lens component 6.3 between them. The use of a detection zoom element 6 enables easy switching between an overview image and a detail image, or efficient locating of the sample details of interest. Furthermore, by means of the detection zoom element 6, the recording of image stacks along the detection direction Z at different sample angles—so-called multiview image stacks—is possible in an easy way. The detection zoom element 6 can be adjusted completely by motor drive. For the automatic compilation of tables of control element positions, one can use an intermediate image sample such as a transmission pattern, e.g., a transmission grid pattern 7, which is moved into an intermediate image plane of the detection beam path. In FIG. 1, this transmission grid pattern 7 is shown in the moved-in state; however, it can also be moved out and is not needed for detection once all parameters have been ascertained. Alternatively, a calibration objective (not shown) can be used in the beam path instead of the detection objective 2.

The setup shown can also facilitate the recording of so-called multitrack micrographs at different wavelengths of light, as one can make use of the fact that different tables for position settings can be compiled for different emission wavelengths. By adjusting the detection zoom element 6 accordingly, one can thus compensate longitudinal chromatic aberrations of the detection device 1.

It is advantageous for this purpose to continuously shift the focal plane in the sample region P by means of the detection zoom element 6. Since the detection zoom element 6 is arranged separately from the detection objective 2, the masses to be moved are very small, as the detection objective 2 itself need not be moved. By means of the detection zoom element 6, which is arranged in a stationary position in the detection beam path, one can effect what is known as internal focusing of the detection beam path. Because of the smaller masses to be moved, image stacks along the detection direction Z, which require repeated focus adjustment, can be recorded at higher accuracies and speeds.

Moreover, water sealing of the sample chamber is facilitated, since the detection objective 2, or its front lens, does not move relative to the sample chamber, in which the sample is placed and whose sample region P is illuminated. Interactions with the sample by vibrations are thus avoided, and no additional forces act on the sample. Moreover, it is possible to specify the detection focal plane as a function of the temperature of the liquid with which the sample chamber is filled, for which purpose the temperature of this liquid is measured and a focus position is adjusted accordingly. If the temperature changes, this change is signaled to the detection element via an evaluation unit and a control unit, and the detection focal plane is adjusted accordingly. In this way, a variation of the refractive index of the liquid with which the sample chamber is filled can be compensated. Frequently, water is used as a liquid or immersion medium. Refractive index data may be stored for different liquids; if the user specifies which immersion medium is used, correct adjustment can then be carried out automatically. This kind of temperature-dependent variation of the detection focal plane can be used, for example, in so-called heat shock experiments, in which the sample or the immersion liquid is subjected to great temperature changes within a very short time.

In the example shown, the detection zoom element 6 is designed to have two movable lens components 6.1, 6.2, between which there is a fixed lens component 6.3; however, other designs with more movable lens components or with only one movable lens component are possible. For example, it may quite well be provided not to use the detection zoom element 6 for internal focusing, i.e. the continuous shifting of the detection focal plane. In this case, one can use, e.g., a tube lens 8 of the tube lens unit 3 for shifting the detection focal plane in the sample region, i.e. for internal focusing. This tube lens 8, then, is arranged so as to be movable along the beam path, as shown symbolically by the double-headed arrow. The tube lens unit 3 is also arranged separately from the detection objective 2, and likewise so from the detection element or detection zoom element 6.

The detection device 1 features several further optical elements, of which some that are more essential are described below. To achieve a compact design, the beam path is directed from the sample region P to the spatially resolving array detector 4 via deflecting mirrors 9 and 10. By means of the beam coupler 11, an additional beam path can optionally be coupled in, which can be used for reflected-light illumination.

Moreover, a dichroic beam splitter 13 may be arranged in the beam path between the zoom element 6 and the imaging element 5 in the near-infinity space 12 of the beam path, i.e., in a range in which the beam is collimated as much as possible but not necessarily completely, the said dichroic beam splitter 13 serving as a splitting means for splitting the detection beam path into two branch beam paths 14 and 15, with a spatially resolving array detector on which the light to be detected can be imaged being arranged in each of the branch beam paths 14 and 15. FIG. 1 shows only the optical elements for the branch beam path 14; the branch beam path 15 may be of identical design.

The dichroic beam splitter has a thickness of more than 3 mm, so that problems such as imaging aberrations due to the occurrence of surface tensions as known in prior art can be avoided. In each of the two branch beam paths 14 and 15, optical imaging elements for the imaging of the light to be detected onto the respective array detector are arranged. In at least one of the two branch beam paths 14 or 15, wobble plates 16 and 17 may optionally be arranged, with which an offset can be adjusted in the two orthogonal directions transversely to the detection axis Z. In this way, an automatic superposition of the measurement data read out from the two array detectors can be accomplished. This is meaningful, e.g., if images for two different emission wavelengths are to be recorded separately and then superposed. For this purpose, FIG. 1 also shows an optional emission filter 18 in the branch beam path 14, with which a wavelength selection can be carried out. A corresponding emission filter 18, which selects another wavelength, may be arranged in the other branch beam path 15. In addition, for the correct adjustment of image superposition, an intermediate image sample may be used for calibration, in such a way that the above-mentioned transmission grid pattern 7 is used in an intermediate image plane of the detection beam path, or that a calibration objective (not shown) is used instead of the detection objective 2.

Furthermore, the optical imaging elements in respective branch beam paths may also be arranged so as to be shiftable, so that it is possible to focus on either respective array detector.

Figure 2:
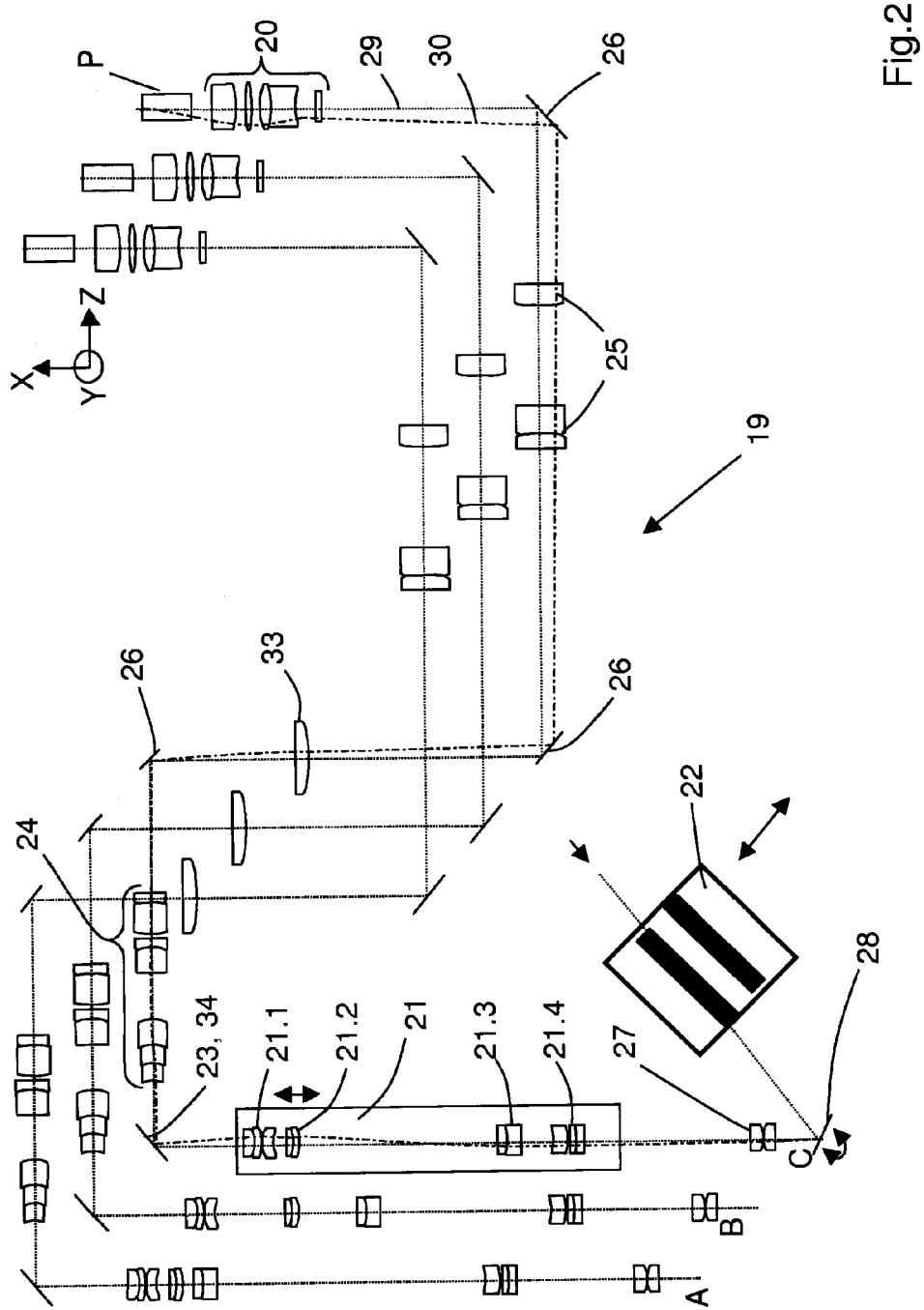
FIG. 2 shows three different settings of the illumination beam path for an SPIM microscope.

FIG. 2 shows an illumination device 19, with which a light sheet to illuminate a sample region P is generated, which light sheet is of approximately planar form in the direction of an illumination axis X of an illumination beam path and in the direction of a transverse axis Y lying across the illumination axis X. For the sake of clarity, a detection device 1 as shown as an example in FIG. 1 has been left out here, but both can readily be combined with each other, with mutual alignment being accomplished in accordance with the coordinate systems shown in FIGS. 1 and 2.

The illumination device 19 illustrated in FIG. 2 is shown in three different configurations A, B and C. The illumination device 19 comprises, in the illumination beam path, at least one illumination objective 20 and an illumination element that is arranged at a distance from a front lens of the illumination objective 20 and can be adjusted independently of this front lens, by means of which illumination element the extension of the light sheet in the direction of the detection axis Z is continuously variable and/or by means of which an illumination focal plane in the sample region P can be shifted continuously. The illumination element may be an integral part of the illumination objective 20, e.g., in the form of two or more lens components that are movable relative to each other, whereas the front lens remains stationary during the movement of these lens components. Alternatively, the illumination element may be arranged as a separate component in the beam path at a distance from the illumination objective 20. During an adjustment of the illumination element, i.e., a shifting of one or several of its lens components along the beam path, the front lens remains stationary.

The illumination element can thus be used to continuously adapt the light sheet to the image field size or to set the focus, respectively. This is possible in a simple way if, e.g., the illumination element is designed as an illumination zoom element 21. This can then be used, particularly if the detection device 1 is also provided with a detection zoom element 6, to optimally and continuously match the numerical aperture of the illumination with the size of the detection image field. Compared to other solutions such as interchangeable telescopes, adaptation of the numerical aperture by means of the illumination zoom element 21 can be done continuously. Compared to other solutions such as diaphragms, no excitation light will be lost, so that, in the end, the illumination source required—as a rule a laser—may have a lower output. In this way, the load on the sample is reduced, higher power densities can be achieved, and the illumination objectives 20 need to be changed less frequently. The ratio between the size of the detection image field and that of the illumination image field can be adjusted in such a way that a ratio of the light sheet thicknesses of 1 in the center to 2 on the margin of the field of view can be set and kept constant when the image field size is varied.

If it is possible in addition, by means of the illumination element, to continuously shift the illumination focal plane in the sample region P—an adjustment that is also accomplished by internal focusing similar as in case of the detection zoom element 6, with one or several lens elements of the illumination zoom element 21 being shifted relative to each other—, the waist of the light sheet can also be shifted continuously across the field of view in the direction of the illumination axis X, a process called waist scanning. In this process, maximum resolution in the detection direction Z can be achieved all over the field of view.

In combination with illumination from two sides along the illumination axis X, internal focusing permits the waists to be positioned to approx. ¼ and approx. ¾ of the field of view. In this way, variations of the thickness of the light sheet can be kept distinctly smaller than in case of illumination from one side only. Finally, in analogy to temperature-dependent focusing as described in connection with the detection zoom element 6, compensation of the position of the light sheet waist as a function of the temperature of the immersion medium or of differing optical thicknesses of the medium used for mounting the sample is possible.

For adapting the illumination-side image field size or the extension of the light sheet to the size of the detection image field, it is of advantage to couple the illumination zoom element 21 and the detection zoom element 6 via a control circuitry for setting the illumination zoom element 21 as a function of the size of the detection image field given by the detection zoom element 6. In this case, if the size of the detection image field is changed, e.g., manually by an observer, the illumination-side image field size is automatically adapted to this change. The observer is thus spared illumination-side adaptation of the illumination zoom element 21, as this is accomplished by the control circuitry, so that the numerical aperture for illumination is always set at an optimum.

The illumination zoom element 21 shown in FIG. 2 is provided with at least three independently shiftable lens components 21.1, 21.2 and 21.3 and a fixed lens component 21.4. The beam paths A, B and C show three different positions of the illumination zoom element 21. The use of three shiftable elements is necessary in this case in order to ensure not only the correct magnification but also the correct imaging of pupil and intermediate image; altogether, then, three degrees of freedom can be set. Where fewer degrees of freedom are relevant, fewer shiftable elements will suffice.

Figure 3:
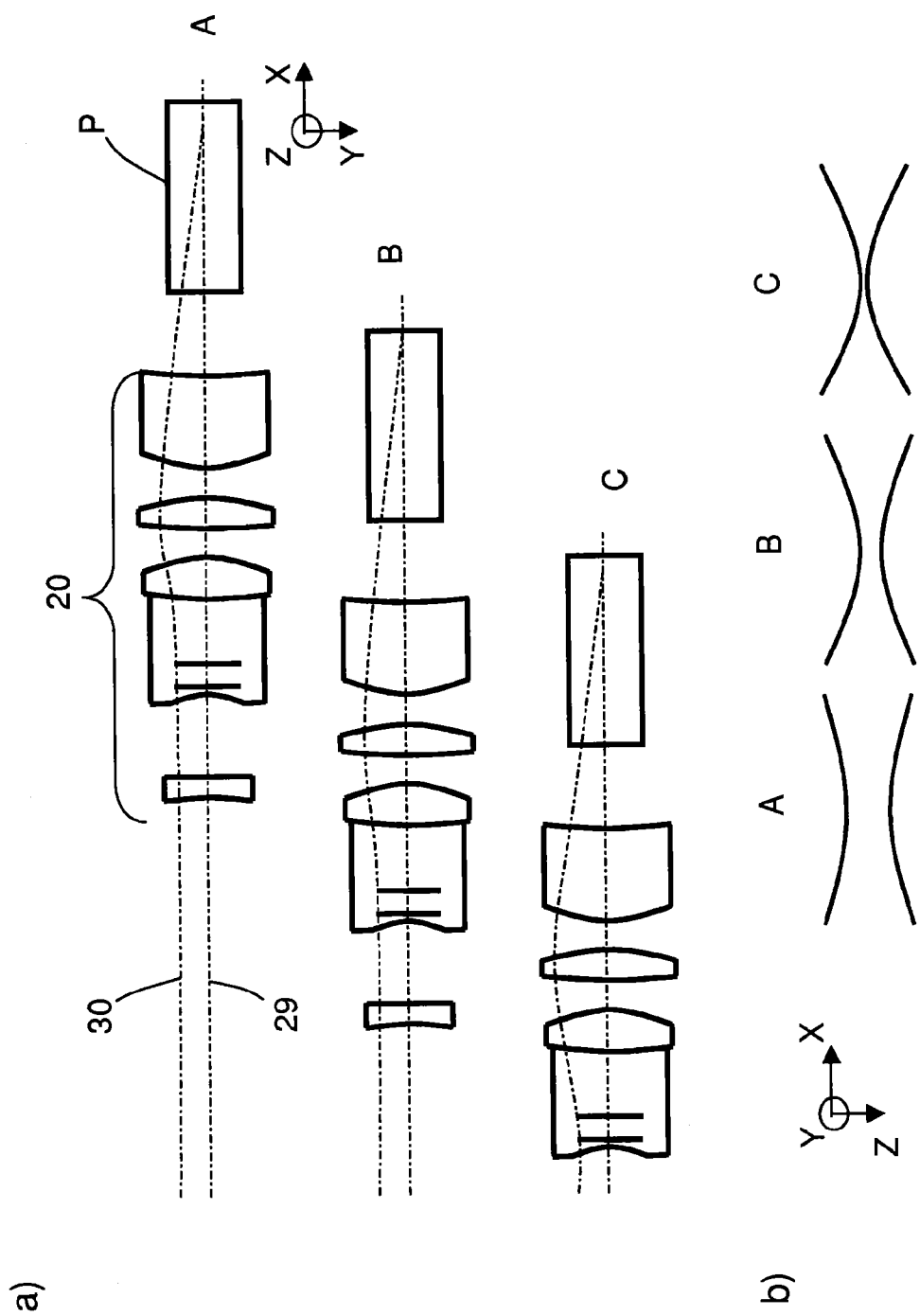
FIG. 3 shows details for the settings shown in FIG. 2.

The effect of the illumination zoom element 21 is shown in some more detail in FIG. 3 for the three different configurations A, B and C. The illumination zoom element 21 reveals its effect both in the plane spanned by the illumination axis X and the transverse axis Y, as shown in FIG. 3a, and in the plane spanned by the illumination axis X and the detection axis Z, as shown in FIG. 3b. In FIG. 3b one can see how, by adaptation of the illumination aperture, the light sheet thickness from position A to position B to position C of the illumination zoom element 21 is rendered increasingly thinner. In FIG. 3a, the adaptation resulting from the setting of the illumination zoom element 21 is shown in the X-Y plane.

To further increase the flexibility regarding the selection of the illumination aperture, the illumination device 19 may also comprise a telescope changer 22, which accordingly broadens the range of apertures achievable. As an alternative or an addition, the illumination objective 20 can be changed to generate a similar effect.

The illumination device 19 shown in FIG. 2 furthermore comprises first means for light sheet generation, which in turn comprise means for generating a rotationally symmetric light beam and scanning means for light-sheet-like scanning of the sample region along the transverse axis Y in a specified time interval. Whereas the means for generating the rotationally symmetric light beam are not shown, the scanning means of the setup shown in FIG. 2 comprise a scanning mirror 23, with which the rotationally symmetric light beam is guided across the sample, at such a speed that the scanner sweeps the sample at least once, but preferably several times, and in any case completely, during the integration time, i.e. the time that passes before the measurement data are read out from the detector; in other words, the integration time must not end as long as the light beam still sweeps the sample. Integration time, scanning time and scanning runs are tuned to each other, so that the specified time interval essentially equals the integration time. The effect of the scanning mirror 23 is not shown in FIG. 2 and FIG. 3, though.

The illumination light leaving the scanning mirror 23 is imaged into the sample region P via a scanning objective 24, a tube lens element 25 and the illumination objective 20. To make the setup as compact as possible, various mirrors 26 are used for beam deflection.

In addition to the scanning mirror 23, the illumination device 19 is optionally provided with second means for light sheet generation, which comprise a first astigmatically acting optical element—in the example shown this is a first cylindrical optical element 27 with at least one astigmatic lens, here a cylindrical lens—for generating a static light sheet. Also provided (not shown) are selecting means, with which, for generating the light sheet, either the first or the second means for light sheet generation or both together can be selected. This means that either the scanning mirror 23 or the cylindrical optical element 27 or both together are used. The cylindrical optical element 27 may be designed, e.g., in such a way that it can be moved into or out of the beam path laterally. In this way, the advantages of both methods for light sheet generation, each described above, can be combined. Instead of a cylindrical lens, the first astigmatically acting optical element may also comprise a Powell lens or other astigmatically acting lenses.

In particular, the general coverage of the image field in the sample region P is linked to the cylindrical optical element 27, which, in the setup shown here, is used simultaneously with the scanning mirror 23. The cylindrical optical element 27, though, cannot cover the full image field in every position of the illumination zoom element 21.

In FIG. 2, the illumination device 19 further comprises optional angle scanning means. In the embodiment shown in FIG. 2, the angle scanning means comprise a rapidly switchable angle scanning mirror 28. By means of the angle scanning mirror 28, the angle between the light sheet and the illumination axis X is variable. As an angle scanning mirror 28, one can use, e.g., a resonance or polygon scanner, including such of a microelectromechanical type. In the case of the first cylindrical optical element 27 being used, the angle scanning mirror 28 is arranged so as to be conjugate with the illumination focal plane. By means of the angle scanning mirror 28, the sample can be illuminated from different angles, which can be used to reduce banding. In FIG. 2, the action of the angle scanning mirror 28 is illustrated for configuration C by the two beam paths 29 and 30. Whereas in beam path 29 the angle scanning mirror is in zero position, i.e., not deflected, beam path 30 applies in case of a deflection of the angle scanning mirror 28 different from zero. This is shown again for all configurations A, B, C in FIG. 3a. The angle scanning mirror 28 operates, as a rule, at a frequency of 10 kHz, whereas the scanning mirror 23 for generating the light sheet operates at a frequency approximately between 1 kHz and 2 kHz.

The use of the cylindrical optical element 27 is of advantage also because, in case of simultaneous use of the angle scanning mirror 28, any beat artefacts that may occur due to asynchronous triggering of the angle scanning mirror 28 and the rapidly switchable scanning mirror 23 are, in part, made indistinct by the cylindrical optical element 27 placed in the beam path. As the use of the cylindrical optical element 27 parallels the light beam, the intensity of illumination is reduced compared to the sole use of the rapidly switchable scanning mirror 23, which is less harmful for the sample.

Figure 4:
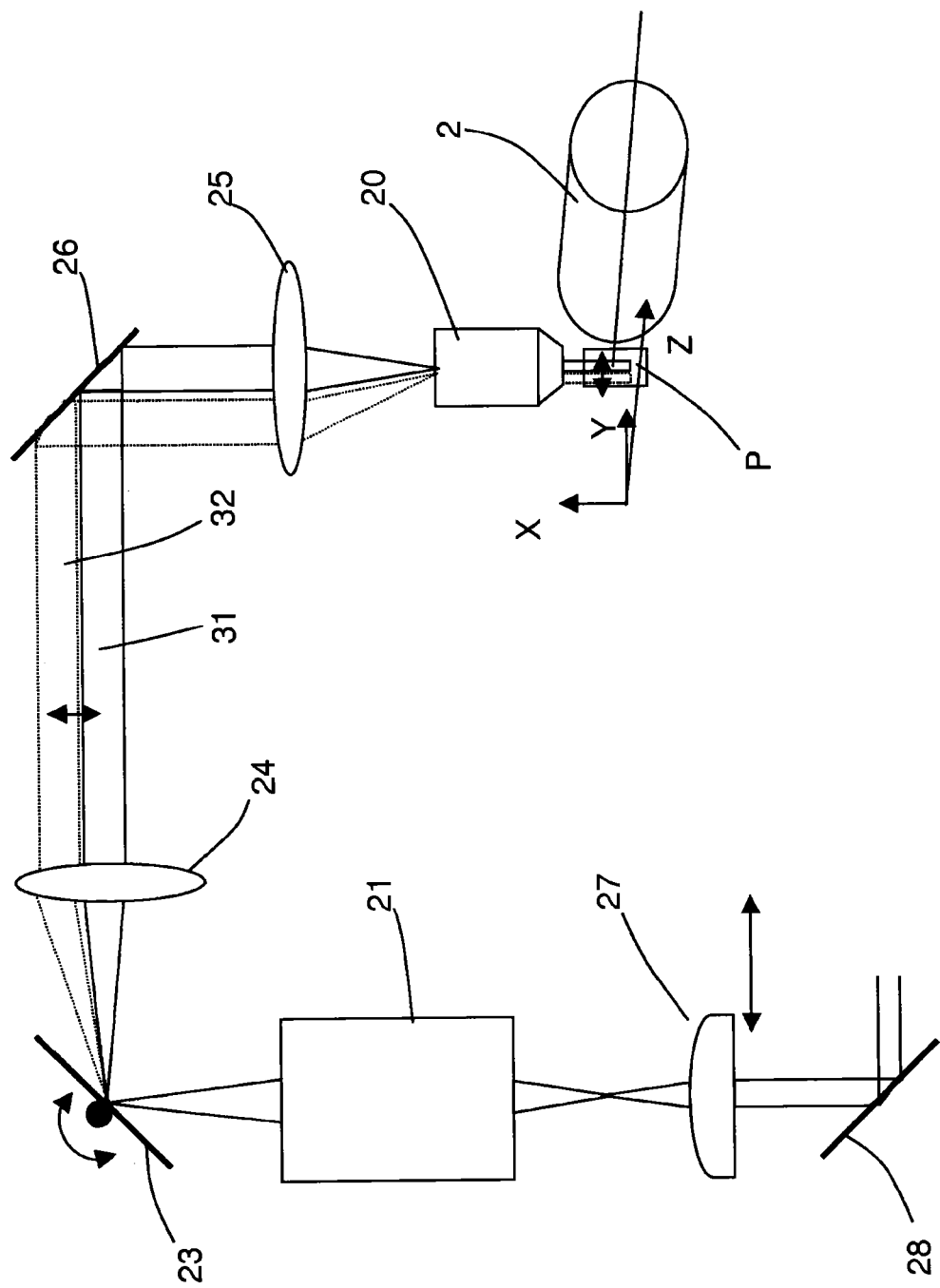
FIG. 4 shows another illumination beam path.

The action of the cylindrical optical element 27 in combination with the rapidly switchable scanning mirror 23 is shown again and in detail in FIG. 4, although here, the various elements of the illumination device are illustrated only roughly by a few representatives. It is obvious here that, if a cylindrical optical element 27 is used alone, given the position of the illumination zoom element 21 sketched here, only part of the image field can be covered, so that the fast scanning mirror 23 has to be used to achieve complete coverage. Without a deflection of the fast scanning mirror 23, the light is imaged into the sample region P along the beam segment 31, whose outlines are shown here. With a deflection different from zero, the light can be directed into the sample region P along the beam section 32. By means of the additional scanning movement of the scanning mirror 23, then, a homogeneous illumination of the sample region P can be achieved. If one refrains from using the scanning mirror 23, though, a very fast, stroboscope-like illumination of the selected sample region becomes possible, which otherwise would be prevented by the slower movement of the scanning mirror 23.

Arranged additionally in the illumination beam path of the illumination device 19 in FIG. 2 is a second astigmatically acting optical element, which is here, for example, a second cylindrical optical element 33. Instead of a cylindrical optical element 33 with at least one cylindrical lens, astigmatically acting elements with Powell lenses can be used as well. This second cylindrical optical element is an optional one, too. It is intended for imaging the fast scanning mirror 23 onto a pupil plane and for imaging the angle scanning mirror 28 onto an illumination focal plane. Without this additional second cylindrical optical element 33 (a correction element), the fast scanning mirror 23 and a switching mirror 34 possibly arranged in the same or an equivalent place in the illumination beam path, intended for light sheet adjustment and/or deflection of the illumination light into a second illumination beam path for illumination from two sides, will only approximately be positioned in the pupil plane of the illumination optical system. The consequence of this is that a position movement in the sample region P, produced by one of the two mirrors 23 or 34, is superposed by a certain share of an angular movement. This can have an unfavorable effect especially for the deflecting mirror 34 (which may perhaps also be used for adjusting the light sheet in the detection direction), because depending on the position of the mirror, an oblique position of the light sheet relative to the detection plane may result.

However, since the illumination in light sheet microscopy features inherent astigmatic properties, these properties can be utilized to achieve exact pupil imaging of both mirrors 23 and 34. The cylindrical optical element 33 acts on one axis only; it is designed and positioned in such a way that the scanning or deflecting mirror that also acts in this axis is imaged onto the pupil. Furthermore, the beam path is designed so that the mirror which acts in the other axis and on which the action of the cylindrical optical element 33 has no influence is also imaged exactly. A superposition of angular shares on a position movement in the sample region P can thus be avoided. Furthermore, the cylindrical optical element 33 can be so designed that the angle scanning mirror 28 is imaged exactly onto the sample plane. Thus, a superposition of the angular movement with a position movement in the sample region P is avoided. As the two mirrors 23 and 34 are arranged very close to each other, the cylindrical optical element 33 is configured to have a very long focal length.

Figure 5:
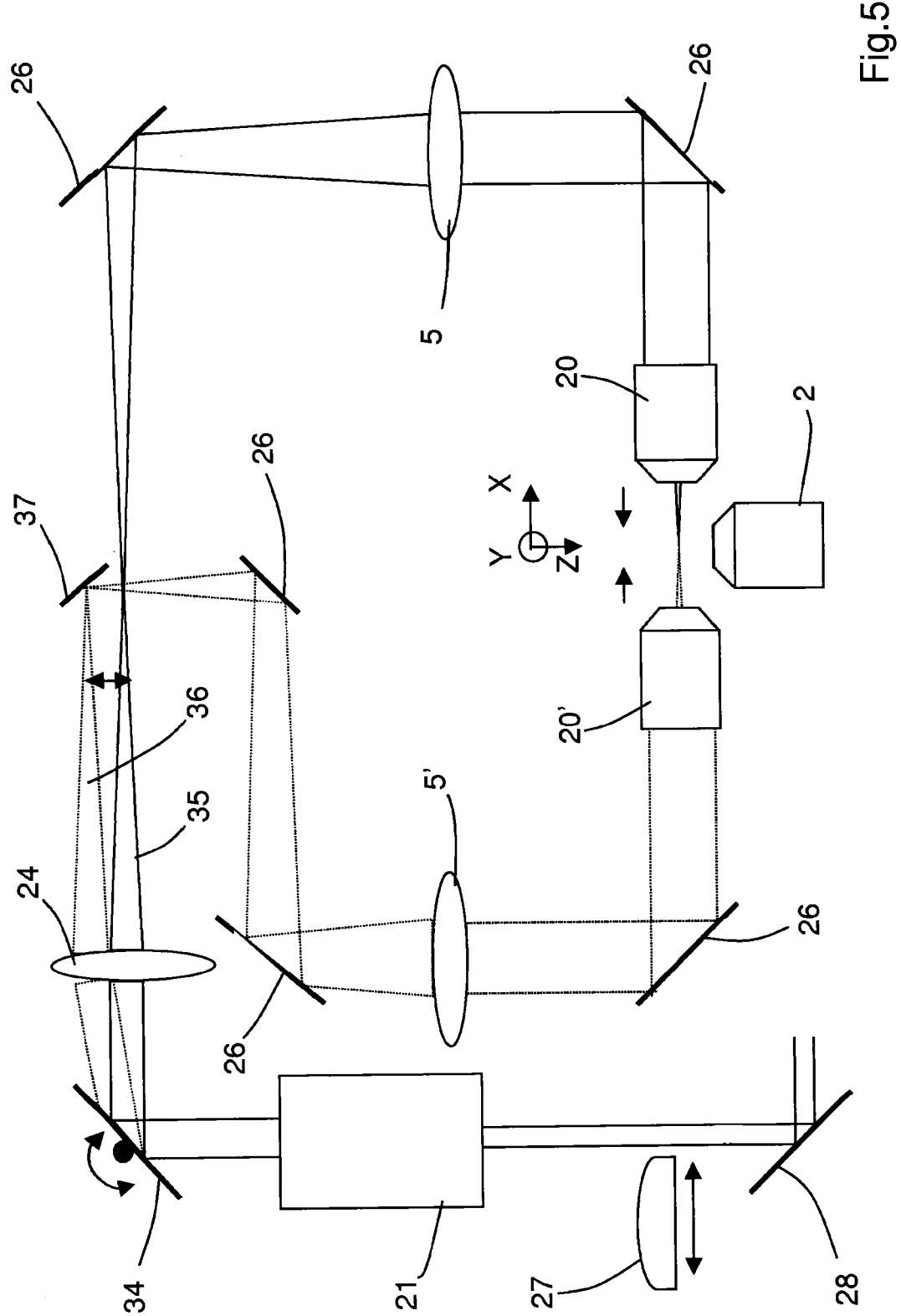
FIG. 5 shows an illumination beam path for illumination from two sides.

FIG. 5 shows a microscope, which may be provided with an illumination device 19, e.g. as illustrated in FIG. 2 and a detection device 1, e.g. as shown in FIG. 1, and in which the illumination device 19 additionally comprises means for deflecting illumination light into another illumination beam path 36 and for generating another light sheet with corresponding properties, i.e., one that extends in the direction of the illumination axis X and in the direction of the transverse axis Y approximately planar. In the illumination beam path 35 and in the other illumination beam path 36, essentially identical optical elements are arranged, and both beam paths have the same optical path lengths; the one light sheet and the other light sheet are aligned with each other in such a way that they illuminate the sample region P from opposite directions on the same illumination axis X.

The illumination device 19 further comprises switching means for switching the illumination light between the illumination beam path 35 and the other illumination beam path 36. The switching means comprise a rapidly switchable switching element with a switching interval of less than 10 ms, with a specified integration time of the array detector 4 and the switching interval of the switching element being tuned to each other in such a way that the sample region P is illuminated at least once from each direction on the illumination axis X during the integration time.

Here, the switching element is designed as a rapidly switchable switching mirror 34. For example, the switching mirror 34 may be galvanometer-driven. The switching mirror 34 is arranged in a plane that is conjugate with the illumination pupil plane. In this way, rapidly switchable two-beam illumination can be achieved. Depending on the position of the switching mirror 34, the light is deflected either into the illumination beam path 35 or—with the aid of a deflecting mirror 37—into the other illumination beam path 36. Depending on the position of the switching mirror 34, thus, the light reaches either the illumination objective 20 or the illumination objective 20'. Both beam paths are designed to have the same optical elements and the same optical path lengths.

Instead of a switching mirror 34, other switching elements may be used as well, such as, e.g., acousto-optical or electro-optical switching elements, which may operate on a reflective or transmissive basis.

What is important is the short switching interval compared to the integration time of the array detector, which, as a rule, is not longer than 20 ms, as otherwise vibrations could have a negative effect; the switching interval must be so dimensioned that the sample region is illuminated at least once from each direction within the integration time. Multiple scans from each direction are also feasible if the switching interval is small enough, e.g., less than 5 ms.

Although this setup does not permit simultaneous illumination of the samples from both sides, the fact that the switching mirror 34 has very short switching intervals makes it possible to achieve quasi-simultaneous illumination if this should be required. For this purpose, it is only necessary to switch the illumination from one illumination beam path to the other once within the integration time of the camera, so that the sample appears in the image as being illuminated simultaneously from both sides, although in fact the illumination is sequential.

In effect, then, the sample in the sample region P is illuminated simultaneously from opposite directions along the illumination axis X, in that, during the integration time of the array detector 4, the illumination light is switched from one illumination beam path to the other at least once.

Figure 6:
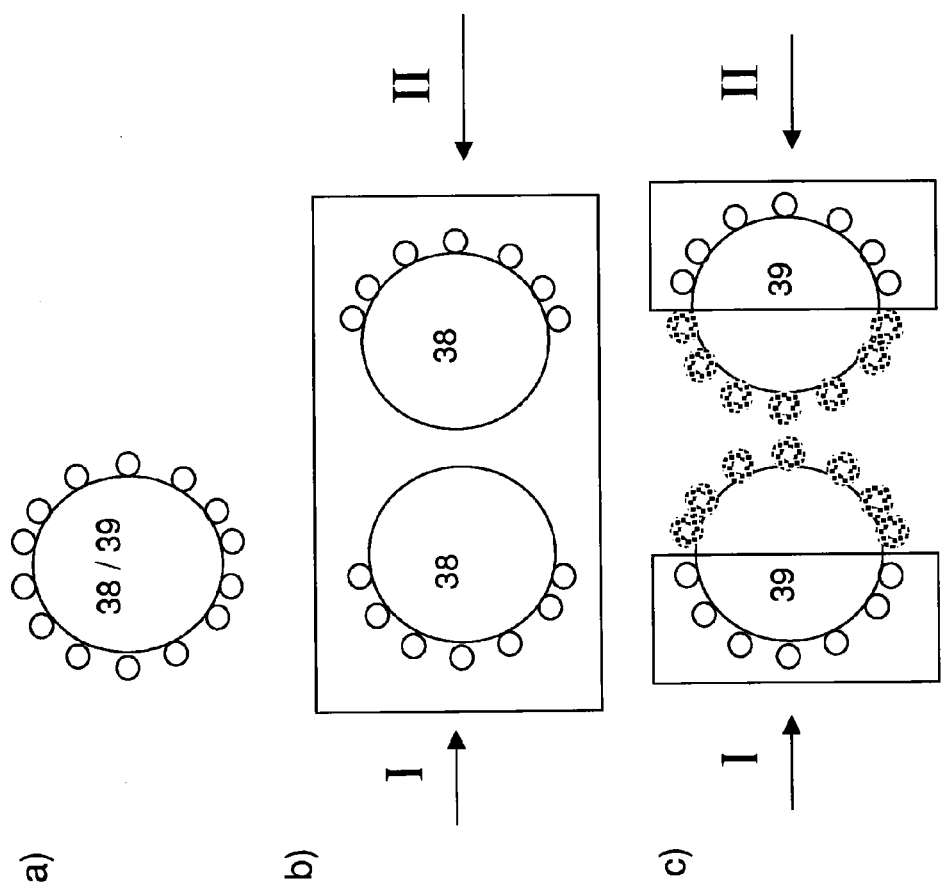
FIG. 6 shows the effects the illumination from two sides has on a sample.

FIG. 6 shows, as an example, a sample 38 in which sequential illumination is not absolutely necessary. FIG. 6a shows the ideal sample image without scatter artefacts. FIG. 6b shows the real images obtained with unilateral light sheet illumination from left (I) and right (II). Here, the sample 38 scatters so much that the two images produced with unilateral illumination do not show any structures in common; a meaningful generation of a common image is hardly possible, if at all, in this case. This is also the case if some light-blocking environment that is essentially nontransparent exists in the middle of the sample. This is the case, at least in part, e.g., with zebra fish embryos, where the embryo's yolk sac blocks the light. Because of the possible speed gain resulting from faster image recording and the omission of subsequent image processing, simultaneous illumination from both sides can make sense here. Although no genuinely simultaneous illumination is possible by means of the fast switching mirror 34 described above, what is possible is a quasi-simultaneous recording, which in effect corresponds to simultaneous illumination. During the integration time of the camera, fast switching-over is performed, which to the user is virtually imperceptible in the final image.

On the other hand, however, the fact that no genuinely simultaneous illumination of the sample is possible will avoid disadvantages occurring in some other samples. Such a sample is shown in FIG. 6 as sample 39; it may be a cell cluster, for example. FIG. 6a shows the ideal sample image with sharp structures throughout the sample region. FIG. 6c shows the real images obtained with unilateral light sheet illumination from left (I) and right (II). Scatter is so pronounced here that with unilateral illumination, while all parts of the sample remain visible, a quality loss from left to right or from right to left is evident. Here, simultaneous two-beam illumination is not appropriate, as the quality loss should be avoided if possible. Sequential illumination makes more sense here. However, sequential illumination must be accomplished very quickly, so that, when a stack of images in the detection direction Z is recorded, there is the possibility to illuminate each individual plane from both sides. Whereas motor-driven switching mirrors have too long switching intervals, with vibrations being possibly transmitted to the mirror, which impairs quality, the fast switching intervals needed, i.e., less than 10 ms, can readily be achieved by means of fast galvanometer-driven mirrors.

The setup shown in FIG. 5 further has the advantage that the switching mirror 34 is arranged in a pupil plane and, therefore, the positional offset produced by the deflection of the switching mirror 34 and the scanning objective 24 is utilized for switching. Of course, other setups are feasible in which the angular offset is directly utilized for switching. Another advantage of the setup shown is the possibility to use the switching mirror 34, by means of a slight offset, simultaneously for light sheet adjustment in the detection direction Z.

The illumination device shown in FIG. 5 may also comprise, although not shown, light sheet generation means for generating a rotationally symmetric light beam—e.g., by means of a scanning mirror 23 and the scanning objective 24—to be used for light-sheet-like scanning of the sample region along the transverse axis, as well as optional angle scanning means—e.g., in the form of an angle scanning mirror 28—, by means of which an angle between the light sheet and the illumination axis can be varied.

Herein it may be of advantage that the illumination device comprises an astigmatically acting optical element, preferably a cylindrical optical element, arranged in the one illumination beam path or in the other illumination beam path and intended for the correct imaging of the switching mirror or of the scanning mirror onto a pupil plane. Whereas the one of the two mirrors is correctly imaged onto the pupil plane, the imaging of the other mirror would not be correct without such an additional astigmatically acting element; this, then, is an optical correction system for the correct imaging of both mirrors.

An interesting application will be possible if the array detector has areas of pixels that can be read out separately and for which different integration times can be specified, as it is the case, e.g., with modern array detectors on CMOS basis. Here, the switching interval of the switching element can additionally be synchronized also with these different integration times. This can also be combined with the embodiment shown in FIG. 4.

Figure 7:
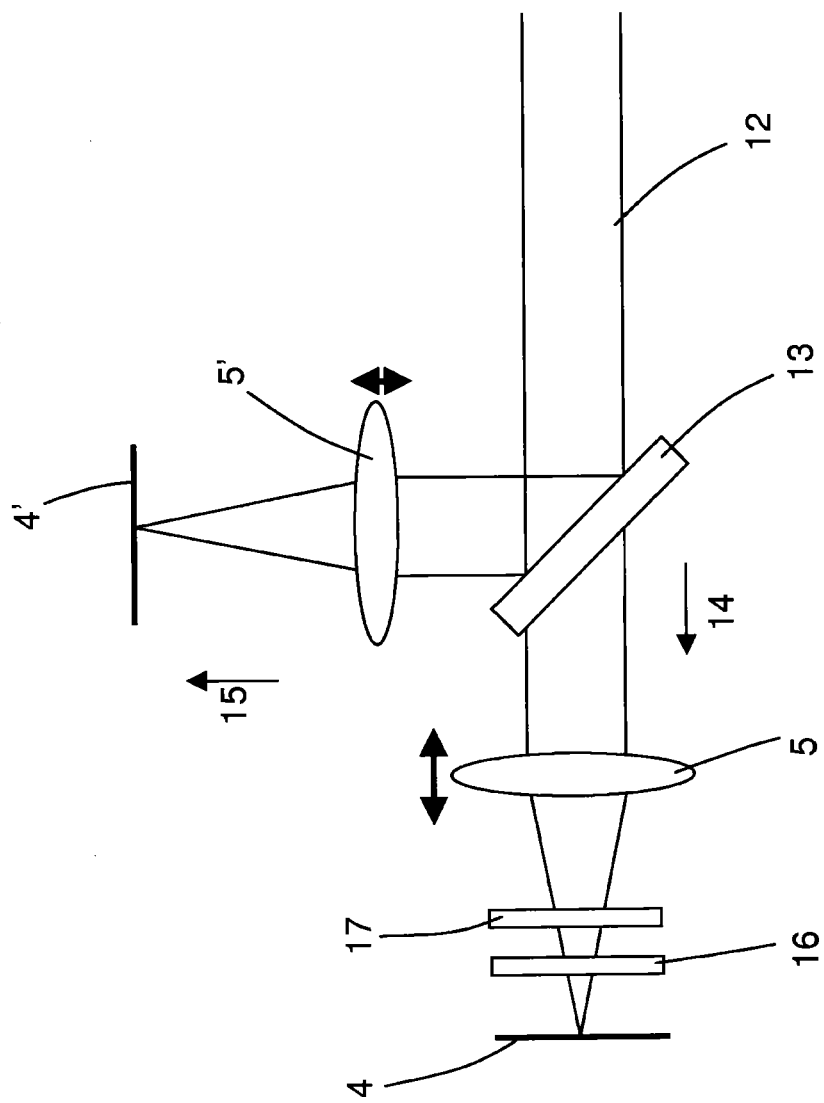
FIG. 7 shows a detail of a detection beam path with two channels.
Figure 8:
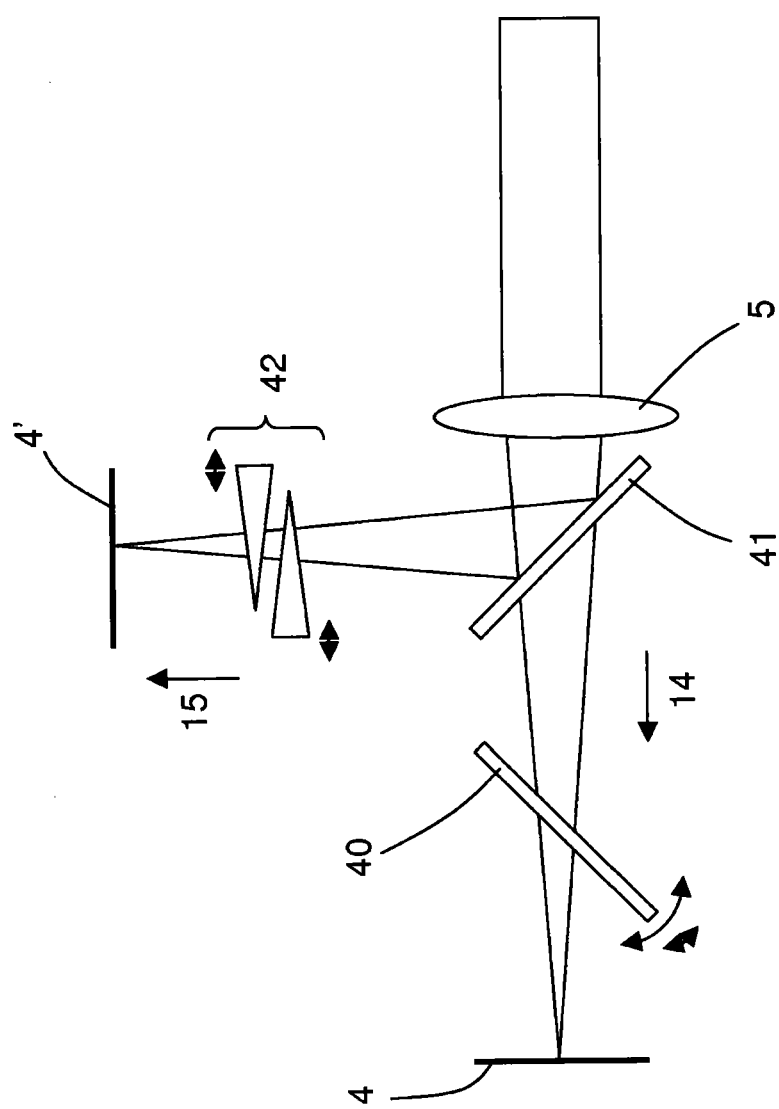
FIG. 8 shows a detail of another detection beam path with two channels.

FIG. 7 and FIG. 8 show splitting means for splitting the detection beam path into two branch beam paths 14 and 15, with a spatially resolving array detector 4 or 4', respectively, onto which the light to be detected is imaged, being arranged in each of the branch beam paths 14 and 15, and with the splitting means comprising at least one dichroic beam splitter 13 or 40, respectively. Both setups can be incorporated into a detection device 1 which is shown, e.g., in FIG. 1 and which can be combined with an illumination device 19 as shown in FIG. 2.

Thanks to the splitting of the detection beam path into two branch beam paths 14 and 15, and with simultaneous suppression of the excitation light with emission filters and bandpass filters, different spectral ranges can be detected via the branch beam paths 14, 15. This makes it possible to record several color ranges, if, e.g., the sample is labeled with fluorophores of different colors. If more than two colors are used, sequential recordings can be made in the so-called multitrack mode by changing the excitation lines and, perhaps, the dichroic beam splitters, bandpass filters or emission filters.

The spatially resolving array detectors 4 and 4' may be CCDs, EMCCDs, CMOS chips or the like, which may be integrated in the cameras employed by users. For mounting such cameras, it is expedient to provide a standard C-mount interface (not shown) that allows the fitting of different camera types and models. The C-mount tolerances of laterally 0.2 mm and the orientation, i.e., the image rotation of the camera, can be compensated, e.g., by adjusting screws.

In the embodiment shown in FIG. 7, the dichroic beam splitter 13 is arranged in the beam path in the near-infinity space 12 with reference to the spatially resolving array detectors 4 and 4'. The dichroic beam splitter 13 has a thickness of at least 3, preferably of at least 4 mm. In this way, image artefacts, particularly defocusing and astigmatism, which are known in prior art and are caused by surface tensions on the beam splitter, can be eliminated. Optical imaging elements 5 and 5', respectively, for imaging the light to be detected onto the respective array detector 4, 4', are arranged in each of the two branch beam paths 14 and 15.

As an option, the optical imaging elements 5 and 5' can, as shown here, be arranged so as to be shiftable in the respective branch beam paths 14 and 15, so that focusing on the respective array detector is possible. This can be of advantage, e.g., if a longitudinal chromatic aberration of the detection optical system has to be corrected. Since what is detected are individual spectral ranges or wavelengths only, very precise adaptation to the wavelength to be detected is possible. If, in addition, other means for focus shifting are provided, such as, e.g., a detection zoom element 6, it is sufficient to arrange a shiftable imaging element in one of the two branch beam paths, while the element in the other branch beam path may be fixed.

In at least one of the two branch beam paths 14 and 15, at least one wobble plate for generating a beam offset along two orthogonal directions transversely to the detection axis Z is arranged in addition. If only one wobble plate is used, it needs to be adjusted in both orthogonal directions. With equivalent effect, two wobble plates can be used. One of them is then used to adjust the beam offset in one direction, and the other is used to adjust it in the direction normal to it. FIG. 7 shows, for one of the two beam paths, i.e. the transmission beam path 14, two wobble plates 16 and 17 for generating a beam offset along two mutually orthogonal directions transversely to the detection axis Z.

One can use the wobble plate 16, e.g., for generating a beam offset in X-direction, and wobble plate 17 for generating a beam offset in Y-direction. In the other branch beam path 15, the reflection beam path, no wobble plates are required. In this way, an image overlay of the two detection channels can be achieved, which can also be accomplished automatically, provided that a calibration has been performed before by means of a calibration objective arranged and selectable in an intermediate image plane of the detection beam path, or by means of a suitable transmission pattern, e.g., a transmission grid pattern 7. Once the beam offset has been determined, the images of both array detectors 4, 4' can readily be superposed, and the user is shown only the superposition.

Focus adjustment can be achieved not only by means of a shifting of the optical imaging elements 5, 5', but also by arranging a wedge assembly 42 consisting of two optical wedges that protrude into the beam path and can be shifted transversely to the beam direction. The wedges are simple glass wedges that can be moved towards each other or away from each other. In this way, a variable, additional glass path is moved into the beam path or out of it, which causes a corresponding shifting of the focal plane of the optical imaging element 5 or 5', respectively. The wedge assembly 42 is arranged between the respective optical imaging element 5 or 5' and the respective array detector 4 or 4' in the divergent part of the beam path, but it is not shown in FIG. 7.

Another embodiment for two-channel detection is shown in FIG. 8. Here, a dichroic beam splitter 40 of any thickness is arranged in the divergent part of the imaging beam path, i.e. between the optical imaging element 5 and the array detectors 4 and 4'. In one of the two branch beam paths, viz. in the branch beam path 14 for the light transmitted by the beam splitter, a glass plate 42 is arranged between the array detector 4 and the beam splitter 40, with an angle of approximately 90° between the glass plate and the beam splitter 40. This glass plate 41 has the same thickness as the beam splitter 40; in this way, the astigmatism caused by the beam splitter 40 in the transmission direction is corrected.

In a preferred embodiment, the glass plate 41 can be used simultaneously as a wobble plate for adjusting the offset between the two camera channels. The glass plate 41 is needed only in the transmission beam path, i.e., in the branch beam path 14, which images the light transmitted by the beam splitter 40 onto the array detector 4. In the reflected branch beam path 15 in FIG. 8, the above-mentioned wedge assembly 42 is arranged, with which the focal plane of the optical imaging element 5 can be shifted by shifting the two glass wedges towards or away from each other (as indicated by the double-headed arrow). Such a wedge assembly 42 may also be arranged in the transmission beam path; in this case one can, e.g., drop the shifting of the optical imaging element 5 so that this need not be shiftable. In principle, though, it is sufficient to have the optical imaging element 5 shiftable and to introduce a wedge assembly 42 into one of the two beam paths. Whereas then, e.g., as in the example shown in FIG. 8, the focal plane for the transmission branch beam path is varied only by means of the optical imaging element 5, the focal plane for the reflection beam path can be further adjusted by means of the wedge assembly 42.

It is understood that the features mentioned before are applicable not only in the combinations stated but also in other combinations or as stand-alone features without leaving the scope of the present invention. The individual elements described above can all be combined with each other. It is also possible to use individual elements without other elements shown; for example, one can do without a zoom device when two branch detection beam paths are used simultaneously. The combination of illumination from two directions can be combined with detection in two channels, and this with the illumination and detection zoom elements and simultaneous internal focusing. Altogether, the arrangements described above exhibit substantial improvements over the arrangements known in prior art.

LIST OF REFERENCE NUMBERS 1 detection device
2 detection objective
3 tube lens unit
4, 4' array detector
5, 5' imaging element
6 detection zoom element
7 transmission grid pattern
8 tube lens
9, 10 deflecting mirror
11 beam coupler
12 near-infinity space
13 beam splitter
14, 15 branch beam path
16, 17 wobble plate
18 emission filter
19 illumination device
20 illumination objective
21 illumination zoom element
22 telescope changer
23 scanning mirror
24 scanning objective
25 tube lens element
26 mirror
27 cylindrical optical element
28 angle scanning mirror
29, 30 beam path
31, 32 beam segments
33 cylindrical optical element
34 switching mirror
35 illumination beam path
36 other illumination beam path
37 deflecting mirror
38, 39 sample
40 beam splitter
41 wedge assembly
42 glass plate

What is claimed is:

1. A microscope, comprising:
an illumination device, that generates a sheet of light extending along an illumination beam path for illuminating a sample region, the sheet of light having an illumination axis X in the direction of the illumination beam path and a transverse axis Y lying across the illumination axis X, the sheet of light having an approximately planar extension; and
a detection device used to detect light that is radiated by the sample region along a detection beam path in a direction of a detection axis Z, wherein the angle between the illumination axis X and the detection axis Z are unequal to zero and the angle between the transverse axis Y and the detection axis Z are unequal to zero,
wherein the detection device comprises a detection objective having a front lens, the detection objective positioned in the detection beam path, and the detection device further comprises an optical detection element located separately from the front lens of the detection objective, the optical detection element adjustable independently of said front lens of the detection objective, whereby adjustment of the optical detection element provides at least one of:
a) continuously and variably changing the size of a detection image field, and b) continuously shifting a detection focal plane in the sample region
wherein the illumination device comprises at least one illumination objective and an optical illumination element, the illumination objective comprising a front lens, the optical illumination element positioned separately from the front lens of the illumination objective, the optical illumination element being adjustable independently from the front lens, whereby the extension of the sheet of light in the direction of the detection axis Z is continuously variable by adjustment of the optical illumination element;
wherein the optical illumination element is configured as a illumination zoom element:
wherein the optical detection element is configured as a detection zoom element, and wherein the illumination zoom element and the detection zoom element are coupled via a control circuitry for setting the illumination zoom element as a function of the size of the detection image field provided by the detection zoom element.

2. The microscope as claimed in claim 1, wherein the detection device is provided with a tube lens unit which is located separately from the detection element and from the detection objective, and the tube lens unit is configured to shift the detection focal plane in the sample region.

3. The microscope as claimed in claim 1, wherein the optical illumination element that is configured as a illumination zoom element comprises at least three lens components which are adjustable independently of each other.

4. The microscope as claimed in claim 1, further comprising a transmission grid element moveable from a first position to a second position and adapted to collect an intermediate image transmission pattern sample, wherein the intermediate image transmission pattern sample is collected when the transmission grid is disposed in the first position in an intermediate image plane of the detection beam path.

5. A microscope, comprising:
an illumination device, that generates a sheet of light extending along an illumination beam path for illuminating a sample region, the sheet of light having an illumination axis X in the direction of the illumination beam path and a transverse axis Y lying across the illumination axis X, the sheet of light having an approximately planar extension; and
a detection device used to detect light that is radiated by the sample region along a detection beam path in a direction of a detection axis Z, wherein the angle between the illumination axis X and the detection axis Z are unequal to zero and the angle between the transverse axis Y and the detection axis Z are unequal to zero,
wherein the detection device comprises a detection objective having a front lens, the detection objective positioned in the detection beam path, and the detection device further comprises an optical detection element located separately from the front lens of the detection objective, the optical detection element being adjustable independently of said front lens of the detection objective, whereby adjustment of the optical detection element provides at least one of:
a) continuously and variably changing the size of a detection image field, and b) continuously shifting a detection focal plane in the sample region;
wherein the illumination device comprises at least one illumination objective and an optical illumination element, the illumination objective comprising a front lens, the optical illumination element positioned separately from the front lens of the illumination objective and the optical illumination element being adjustable independently from the front lens of the illumination objective, whereby an illumination focal plane in the sample region is continuously adjustable by adjustment of the optical illumination element;
wherein the optical illumination element is configured as a illumination zoom element; and
wherein the optical detection element is configured as a detection zoom element, and wherein the illumination zoom element and detection zoom element are coupled via a control circuitry for setting the illumination zoom element as a function of the size of the detection image field provided by the detection zoom element.

6. The microscope as claimed in claim 5, wherein the optical illumination element that is configured as a illumination zoom element comprises at least three lens components which are adjustable independently of each other.

7. The microscope as claimed in claim 5, wherein the detection device is provided with a tube lens unit which is located separately from the detection element and from the detection objective, and the tube lens unit is configured to shift the detection focal plane in the sample region.

8. The microscope as claimed in claim 5, further comprising a transmission grid element moveable from a first position to a second position and adapted to collect an intermediate image transmission pattern sample, wherein the intermediate image transmission pattern sample is collected when the transmission grid is disposed in the first position in an intermediate image plane of the detection beam path.

9. A method, comprising:
adjusting an illumination device for a selective plane illumination microscopy microscope,
wherein said illumination device generates a substantially planar light sheet extending along an illumination beam path for illuminating a sample region, the sheet of light having an illumination axis $X_{ill}$ along the illumination beam path and a transverse axis $Y_{trans}$ lying across the $X_{i11}$, the sheet of light having an approximately planar extension; and
detecting via a detection device the light sheet along a detection beam path that defines a detection axis $Z_{dx}$, wherein the angle between the $X_{ill}$ and the $Z_{dx}$ are unequal to zero and the angle between the $Y_{trans}$ and the $Z_{dx}$ are unequal to zero,
wherein the detection device comprising a detection objective having a front lens, the detection objective positioned in the detection beam path, the detection device further comprises an optical detection element which is located separately from the front lens of the detection objective, the optical detection element being adjustable independently of said front lens of the detection objective, whereby adjustment of the optical detection element provides at least one of:
a) continuously and variably changing the size of a detection image field, and b) continuously adjusting a detection focal plane in the sample region; and
wherein the detecting step includes collecting a plurality of multiple track micrograph images with at least some of said plurality collected images collected at different wavelengths of light sheet radiation along the detection beam path.

10. The method according to claim 9, wherein the detecting device comprises one of a charge-coupled device, a digital camera, and a complementary metal oxide semiconductor chip.

11. The method according to claim 9, further comprising splitting the illumination beam path so that a pair of beam paths are formed and each of the pair of beam paths impinge upon the sample region from opposing sides of the sample region.

12. The method according to claim 9, further comprising:
moving a transmission grid element from a first position to a second position and to collect an intermediate image transmission pattern sample at the first position, wherein the intermediate image transmission pattern sample is collected in an intermediate image plane of the detection beam path.

13. The method according to claim 9, further comprising:
measuring a temperature of a fluid residing in a sealed container that envelops the sample region; and
with reference to a refraction index of the fluid residing in the sealed container, adjusting at least one of: a detection focal plane and the temperature of the fluid.

14. The method according to claim 9, wherein the detecting step includes collecting a plurality of multiview image stack images with at least some of said plurality of collected images collected at differing sample angles of the light sheet traveling along the detection beam path.

* * * * *

UNITED STATES PATENT AND TRADEMARK OFFICE
CERTIFICATE OF CORRECTION

PATENT NO. : 9,110,301 B2
APPLICATION NO. : 13/497996
DATED : August 18, 2015
INVENTOR(S) : Helmut Lippert et al.

Page 1 of 1

It is certified that error appears in the above-identified patent and that said Letters Patent is hereby corrected as shown below:

In the Specification

Col. 9, line 22, delete "of"

Col. 9, line 51, delete "aligning" and insert --align--

Col. 20, line 11, after "3" insert --mm--

Signed and Sealed this
Fifth Day of July, 2016

Michelle K. Lee
*Director of the United States Patent and Trademark Office*